(12) United States Patent
Poledna et al.

(10) Patent No.: US 10,089,199 B2
(45) Date of Patent: Oct. 2, 2018

(54) FAULT-TOLERANT HIGH-PERFORMANCE COMPUTER SYSTEM FOR AUTONOMOUS VEHICLE MANEUVERING

(71) Applicant: FTS Computertechnik GmbH, Vienna (AT)

(72) Inventors: Stefan Poledna, Klosterneuburg (AT); Georg Niedrist, Guntramsdorf (AT); Eric Schmidt, Grosskrut (AT); Martin Hoefler, Kritzendorf (AT)

(73) Assignee: FTS Computertechnik GmbH, Vienna (AT)

( * ) Notice: Subject to any disclaimer, the term of this patent is extended or adjusted under 35 U.S.C. 154(b) by 70 days.

(21) Appl. No.: 15/459,363

(22) Filed: Mar. 15, 2017

(65) Prior Publication Data

US 2017/0270014 A1    Sep. 21, 2017

(30) Foreign Application Priority Data

Mar. 16, 2016  (AT) .............................. A 50220/2016
Mar. 24, 2016  (AT) .............................. A 50246/2016

(51) Int. Cl.
*G06F 11/00* (2006.01)
*G06F 11/20* (2006.01)
*G05D 1/00* (2006.01)
*B60R 16/023* (2006.01)
*B60W 50/00* (2006.01)
*G06F 11/07* (2006.01)

(52) U.S. Cl.
CPC ........ *G06F 11/203* (2013.01); *B60R 16/0232* (2013.01); *B60W 50/00* (2013.01); *G05D 1/00* (2013.01); *G05D 1/0077* (2013.01); *G05D 1/0088* (2013.01); *G06F 11/2035* (2013.01); *G06F 11/2041* (2013.01); *G06F 11/0796* (2013.01); *G06F 2201/805* (2013.01)

(58) Field of Classification Search
CPC ...... G06F 11/00; G06F 11/22; G06F 11/0751; G06F 11/30; G06F 11/3466; G06F 11/3426
USPC .......................................................... 714/11
See application file for complete search history.

(56) References Cited

U.S. PATENT DOCUMENTS

| | | | | |
|---|---|---|---|---|
| 9,451,020 | B2* | 9/2016 | Liu | H04W 76/10 |
| 2015/0239436 | A1* | 8/2015 | Kanai | B60T 7/08 |
| | | | | 701/23 |
| 2015/0274027 | A1* | 10/2015 | Crombez | B60L 11/1853 |
| | | | | 701/22 |
| 2017/0032585 | A1* | 2/2017 | Stenneth | G07C 5/008 |
| 2017/0185078 | A1* | 6/2017 | Weast | H04W 4/008 |

\* cited by examiner

*Primary Examiner* — Sarai E Butler
(74) *Attorney, Agent, or Firm* — Eversheds Sutherland (US) LLP (57) ABSTRACT

A fault-tolerant high-performance computer system is provided for executing control processes for autonomous maneuvering of a vehicle.

17 Claims, 8 Drawing Sheets

FAULT-TOLERANT HIGH-PERFORMANCE COMPUTER SYSTEM FOR AUTONOMOUS VEHICLE MANEUVERING

The invention relates to a computer system. In particular, the invention relates to a fault-tolerant high-performance computer system for executing control processes for autonomous maneuvering of a vehicle.

The invention relates to the area of computer systems, in particular fault-tolerant computer systems. The invention describes an innovative hardware to enable the autonomous maneuvering of a vehicle, such as, for example, an automobile, a plane, an unmanned aerial vehicle (UAV), ship, boat, etc. A key element of the invention is in the ability to withstand the failure of parts of the subsystem, such that the computer system is able to provide some well-defined functionality also in the presence of failures.

In the context of this text the term "autonomous maneuvering" means on the one hand fully autonomous maneuvering, where no interaction of the driver of the vehicle is necessary, and in the other hand partly autonomous maneuvering, wherein the computer system takes over specific parts of the maneuvering of the vehicle, but wherein an interaction of the driver with the vehicle is still necessary.

With increasing computational power in state-of-the-art computer system it becomes possible to have vehicles maneuver autonomously. An automobile, for example, implements a multitude of sensors to derive a concrete picture of the environment. A computer system is then able to generate output for actuators which then, in turn, maneuver the vehicle in a three dimensional space (3-D). For example, an automobile may use cameras to sense the environment. An on-board computer system will interpret the video data in real-time and generate steering, accelerating, breaking, etc. signals for the actuators.

Series deployment of such vehicles will demand that certain functions are executed in a fault-tolerant manner, i.e., some degree of system functionality must be guaranteed also in presence of failures. In particular, this means that the computer systems themselves, used to run algorithms for partly/fully maneuvering, must be constructed as fault-tolerant computer systems.

While current state of the art is primarily concerned with developing the actual functionality of maneuvering, this invention targets at the fault-tolerance aspects of autonomous maneuvering.

It is an object of the invention to disclose a cost-effective way to realize a fault-tolerant high-performance computer system.

This object is achieved with a fault-tolerant high-performance computer system for executing control processes for autonomous maneuvering of a vehicle, wherein a control process comprises tasks, and wherein the computer system comprises processors for executing the tasks of a control process, and wherein the computer system comprises a number n of fault-containment regions, with n≥2 (n=2, or 3, or 4, etc.), and wherein each fault-containment region comprises at least one processor constructed as safety-processor, and wherein at least one fault-containment region additionally comprises at least one processor constructed as performance processor, and wherein in the case of a failure of one fault-containment region, or, for n≥3, of the failure of one or more, at maximum n−1, fault-containment regions, the computer system is equipped in such a way that it is capable of executing at least a specific set of tasks on the remaining, non-faulty fault-containment region or non-faulty fault-containment regions, wherein the tasks of said specific set of tasks are elected in such a way that the computer system remains capable of autonomous maneuvering or at least partially maneuvering the vehicle, or wherein the computer system is at least capable of bringing the vehicle into a safe state.

The cost benefit is established by trading high-performance against fault-tolerance. I.e., in absence of failures the overall computer system will be used to execute high-performant computations, while in presence of failures, the high-performant computation can be downgraded to execute tasks on failing components. This invention discloses such cost-effective fault-tolerant computer systems that provide high-performance suitable for autonomous maneuvering of vehicles.

A specific set of tasks can comprises a number of the tasks of the control process. Additionally, it may comprise reduced tasks of said control process. The latter can be the case when, for example, a safety processor is not capable of executing a (performance) task of a performance processor, but the safety processor is able to execute this task in a reduced form.

It may also be the case that the specific set of tasks comprises "new" tasks, which are not originally being comprised in the control process. This new tasks may be provided in the specific set of tasks in addition to some original tasks and/or in addition to one or more reduced tasks, however it may also be provided that the specific set of tasks only comprises "new" tasks.

It may also happen that in the case of a fault of at least one of the fault-containment regions the input to the tasks will change.

For example: Safety is defined as the absence of catastrophic consequences on the user(s) and the environment. Avižienis, Algirdas, Jean-Claude Laprie, Brian Randell, and Carl Landwehr. "Basic concepts and taxonomy of dependable and secure computing."

For example: Dependable and Secure Computing, IEEE Transactions on 1, no. 1 (2004): 11-33. A system is, thus, safe when it is in a state of absence of catastrophic consequences on the user(s) and the environment, e.g., an airplane or autonomous vehicle operating typically operate in a safe state. Safety potentially can be violated, for example by the occurrence of failures in a system. Safety-relevant and safety-critical tasks are tasks that in case of improper functioning can potentially lead to unsafe system states. Sometimes the terms safety-relevant and safety-critical are used synonymously. However, w the different terms may also be used to indicate the level of severity of the unsafe system state, where safety-related is less severe than safety-critical.

Advantageous embodiments of a computer system according to the invention are described in the dependent claims.

We define tasks as general computation entities. Typically a complex software product like a control process of an autonomous maneuvering vehicle is composed of a multitude of tasks.

Some tasks of the control process may be performance tasks. These tasks are characterized by high computational complexity such as found in the computer vision domain. Typically these performance tasks require processors which we call performance processors, and which implement a significant higher amount of hardware resources than found in what we call safety processors. These performance processors on which the performance tasks are executed are capable of executing the performance tasks sufficiently efficient such that the results of the performance tasks can be used in the overall control process of the vehicle. Since the performance processors are typically complex devices it is in general not possible to develop the performance processors according safety standards and, thus, it is not possible to develop processors that are both, performance and safety processors.

Advantages of the computer system according to the invention are detailed hereinafter:

- the computer system may comprise exactly two fault-containment regions;
- exactly one of the fault-containment regions comprises a performance processor;
- in the case that the computer system does not exhibit a failure the processors of at least one, so-called first, fault-containment region, preferably of exactly one, so-called first, fault-containment region, which at least one first fault-containment region comprises at least one performance processor additionally to at least one safety processor, execute specific tasks, which tasks are completely describing the control process for autonomous maneuvering, and wherein said at least one performance processor, when executing its tasks, provides a specific functionality, the so-called first performance functionality, and said at least one safety processor, when executing its tasks, provides another functionality, the so-called first safety functionality;
- the tasks of said specific set of tasks are elected such, that in the case that the at least one first fault-containment region is faulty,
  - at least one, so-called second, safety-processor of at least one non-faulty, so-called second, fault-containment region, by executing said specific set of tasks, delivers a functionality corresponding or identical to the first safety functionality, or
  - at least one, so-called second, safety-processor of at least one non-faulty, so-called second, fault-containment region, by executing said specific set of tasks, delivers a functionality corresponding or identical to the first safety functionality and part of the first performance functionality, or
  - in the case that the at least one non-faulty, so-called second, fault-containment region comprises in addition to the at least one, so-called second, safety processor at least one, so-called second, performance processor, the tasks of said specific set of tasks are elected such that by executing said specific set of tasks the processors of the second fault-containment region can deliver the first safety functionality and part of the or the complete first performance functionality, wherein preferably the at least one second safety processor delivers the first safety functionality and the at least one second performance processor delivers the first performance functionality or part of the first performance functionality;
- in the case that the computer system does not exhibit a failure, the processors of at least one, so-called first, fault-containment region, preferably of exactly one, so-called first, fault-containment region, which at least one first fault-containment region comprises at least one performance processor additionally to at least one safety processor, together with at least one processor of at least one, so-called second, fault-containment region execute specific tasks, which tasks are completely describing the control process for autonomous maneuvering, and wherein said at least one performance processor, when executing its tasks, provides a specific functionality, the so-called first performance functionality, and said at least one safety processor, when executing its tasks, provides another functionality, the so-called first safety functionality, and wherein the at least one safety processor of said at least one second fault-containment region, when executing its tasks, provides a third functionality, the so-called second safety functionality, and wherein optionally said at least one second fault-containment region comprises at least one, so-called second, performance processor, which at least one second performance processor delivers, when executing its tasks, a second performance functionality;
- the tasks of said specific set of tasks are elected such, that in the case that the at least one second fault-containment region is faulty, the at least one first non-faulty fault-containment region, by executing said specific set of tasks, delivers, in addition to the first safety functionality and to the first performance functionality, a functionality corresponding or identical to the second safety functionality;
- the tasks of said specific task set are elected such that the at least one safety processor delivers, in addition to the first safety functionality, the second safety functionality;
- provided, that the at least one second fault-containment region comprises in addition to the at least one second safety processor at least one second performance processor, which at least one second performance processor delivers, when executing its tasks, a second performance functionality, in the case that said at least one second fault-containment region is faulty, the at least one first non-faulty fault-containment region, by executing said specific set of tasks, delivers, in addition to the first safety functionality and in addition to the first performance functionality, a functionality corresponding or identical to the second safety functionality, and preferably an additional functionality, which is corresponding or identical to the second performance functionality, or which additional functionality delivers at least a part of the second performance functionality;
- the tasks of said specific task set are elected such that the at least one performance processor of the at least one non-faulty first fault-containment region delivers said additional functionality;
- the tasks of said specific set of tasks are elected such, that in the case that the at least one first fault-containment region is faulty, the at least one second non-faulty fault-containment region, by executing said specific set of tasks, delivers, in addition to the functionality or functionalities of its at least one processor, a functionality corresponding or identical to the first safety functionality;
- the at least one second safety processor delivers, in addition to its second functionality, the functionality corresponding or identical to the first safety functionality;
- the at least one second safety processor delivers part of the functionality of the first performance processor of the at least one first fault-containment region;
- provided, that the at least one second fault-containment region comprises in addition to the at least one second safety processor at least one second performance processor—, the second performance processor delivers, in addition to its functionality, at least part of the functionality of the first performance processor or the full functionality of the first performance processor;

at least one of the fault-containment regions exchanges information with sensors and actuators in the vehicle via communication channels;

it comprises a communication subsystem for the exchange of information between the fault-containment regions;

the safety processors of different fault-containment regions are identical;

the performance processors of different fault-containment regions are identical;

the safety processors of at least two different fault-containment regions are different;

the performance processors of at least two different fault-containment regions are different.

In the following, the present invention is described in more detail with reference to the drawings, which show.

The following explanations and definitions are not only valid in connection with the specific arrangements as depicted and described by the figures, but are valid for the invention in its general scope.

Figure 1:
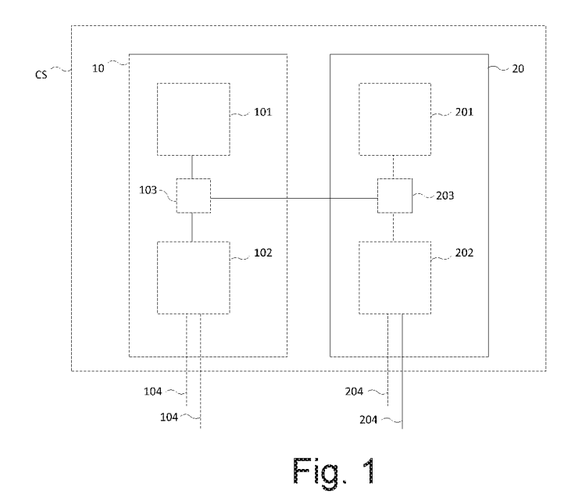
FIG. 1 a computer system according to the invention.

In FIG. 1 a fault-tolerant high-performance computer system CS is depicted. The CS consists of two fault-containment regions 10, 20. In this case, both fault-containment regions 10, 20 consist of processors 102, 202 designed for executing safety-critical and/or safety-relevant tasks, called the "safety processors".

For example in the automotive industry the ISO 26262 standard is a relevant standard that defines ASIL levels. A processor that is to be used in safety-critical and/or safety-related applications needs to fulfill certain requirements defined by the ISO 26262 to meet a certain ASIL level. Another example of relevant set of standards are the DO 178b/c and the DO 254 standards for the avionics industry. Again, these standards define certain characteristics such that a processor is allowed to be used in a safety-critical and or safety-relevant context.

FIG. 1 also shows that both fault-containment regions 10, 20 implement processors 101, 201 that are not designed according industry-specific safety standards. Examples for such processors can be high-performance processors for graphics operations used as for example in a computer vision systems. We call this second set of processors the "performance processors".

FIG. 1 furthermore shows that both fault-containment regions 10, 20 implement a communication subsystem 103, 203 used to exchange information between the safety processors and the performance processors as well as exchange information between the two fault-containment units 10, 20.

FIG. 1 furthermore shows that both fault-containment regions 10, 20 implement connectivity 104, 204 to sensors and/or actuators and/or other electronic control units (ECUs) in the vehicle.

Figure 2:
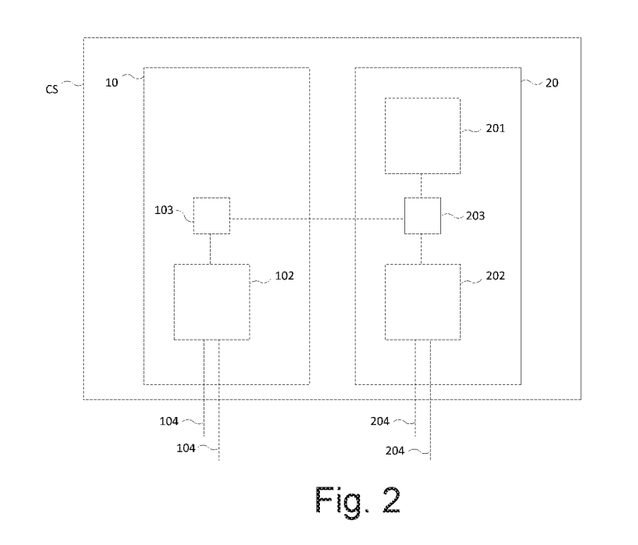
FIG. 2 an alternative design of a computer system according to the invention.

FIG. 2 shows an alternative design of a computer system CS according to the invention.

Here, only one fault-containment region 20 implements both, a safety processor 202 as well as a performance processor 201, while the respective other fault-containment region 10 only implements a safety processor 102.

Figure 3:
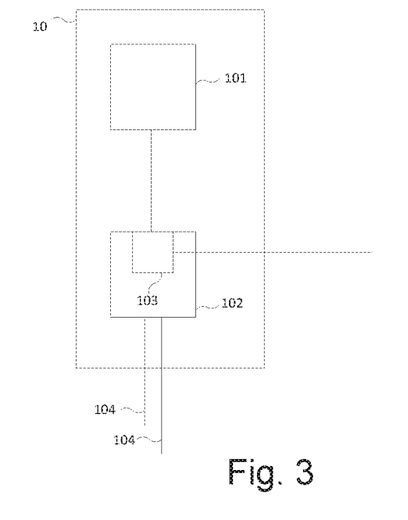
FIG. 3 a possible arrangement of a fault-containment region in which the communication subsystem is integrated in a safety processor, FIG. 4-FIG. 11 schematically the assignment of tasks to processors of the computer system in the non-faulty case an in the faulty case, FIG. 12 an example of a set of tasks executed by a CS according to FIG. 1, FIG. 13 an example of a set of tasks executed by a CS according to FIG. 2, FIG. 14 an example of communication in the CS, FIG. 15 a similar communication scenario of time-triggered communication as shown in FIG. 14, and FIG. 16 a sequence of operational steps that ensures that the partly-autonomous and/or fully-autonomous vehicle operation remains save.

FIG. 3 depicts possible arrangement of a fault-containment region 10 in which the communication subsystem 103 is integrated in a safety processor 102.

A control process COP comprises tasks, which tasks are executed by the processors of the computer system.

In the following FIGS. 4 to 11, different arrangements will be shown. In this arrangement the two fault-containment regions of the computer system are denoted by FCR1, FCR2.

It is assumed that the first fault-containment region FCR1 comprises a safety processor S1 and a performance processor P1. This processors are also denoted as "first safety processor" S1 and "first performance processor" P1.

Further, it is assume that the second fault-containment region FCR2 comprises a safety processor S2. This safety processor S2 is also denoted as "second safety processor" S2.

In specific embodiments, the second fault-containment region FCR2 may also comprise a performance processor P2, the so-called "second performance processor" P2.

Each processor is equipped such that in the non-faulty case of the computer system CS it executes specific tasks. By executing its tasks or its specific set of tasks each processor provides a specific functionality.

In the non-faulty case of the computer system the first performance processor P1 provides a "first performance functionality". In the non-faulty case of the computer system the first safety processor P1 provides a "first safety functionality". In the non-faulty case of the computer system the second safety processor S2 provides a "second safety functionality", and the second performance processor P2, if existing, provides in the non-faulty case of the computer system a "second performance functionality".

For instance, a particular task, based on a particular input, delivers, when executed by a processor, a specific output.

For instance, the functionality of a processor can be understood as the entire output of all tasks which are executed by said processor.

According to the invention the computer system CS is equipped in such a way that in the case of a fault of one of the two fault-containment regions it is capable of executing at least a specific set of tasks on the remaining, non-faulty fault-containment region, so that the computer system CS remains capable of autonomous maneuvering or at least partially maneuvering the vehicle, or wherein the computer system CS is at least capable of bringing the vehicle into a safe state. For example, bringing into a safe state in the case of a car means that the car is driving into a safe place, for example to the roadside. In general, the term "safe state" depends on the specific application but is well-known to person skilled in the art.

The specific set of tasks can comprises a number of the tasks of the "original" control process on the non-faulty case. Additionally, it can comprise reduced tasks of said control process. The later can be the case when, for example, a safety processor is not capable of executing a (performance) task of a performance processor, but the safety processor is able to execute this task in a reduced form.

It may also be the case that the specific set of tasks comprises "new" tasks, which are not originally being comprised in the control process. This new tasks may be provided in the specific set of tasks in addition to some original tasks and/or in addition to one or more reduced tasks, however it may also be provided that the specific set of tasks only comprises "new" tasks.

Figure 4:
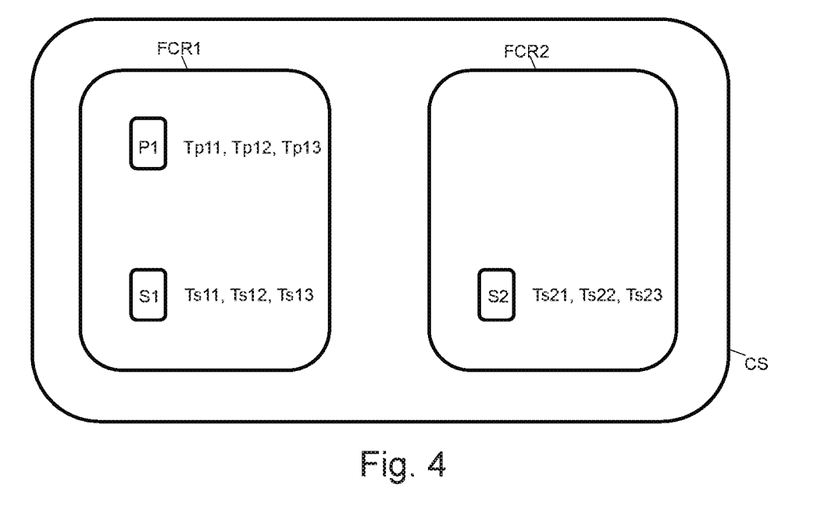

FIG. 4 depicts a computer system CS with a first fault-containment region FCR1 with a (first) safety processor S1 and a (first) performance processor P1, and a second fault—(containment region FCR2, which only comprises (second) safety processor S2.

It should be noted that in general each processor executes a (large) number for tasks. For the sake of simplicity the following description will make use of only a small number of tasks, for example of three tasks for each processor.

In the non-faulty case the first performance processor executes specific tasks Tp11, Tp12, Tp13, delivering the first performance functionality and the first safety processor S1 executes specific tasks Ts11, Ts12, Ts13, delivering the first safety functionality.

It is assumed that the first safety functionality and the first performance functionality or their respective tasks are completely describing the control process (COP) for autonomous maneuvering.

The second safety processor S2 is executing its tasks Ts21, Ts22, Ts23. These tasks may be identical to the tasks of the first safety processor S1, or some or all tasks may be different. In the latter case the second safety processor S2 delivers a different functionality than the first safety processor S1.

The above describes the non-faulty case.

Now, in the case that the second fault-containment region FCR2 is faulty (not shown in the figures), the first fault-containment region FCR1 can provide the full control process for autonomous maneuvering. The specific set of tasks corresponds to the tasks already being executed by the first fault-containment region FCR1.

Figure 5:
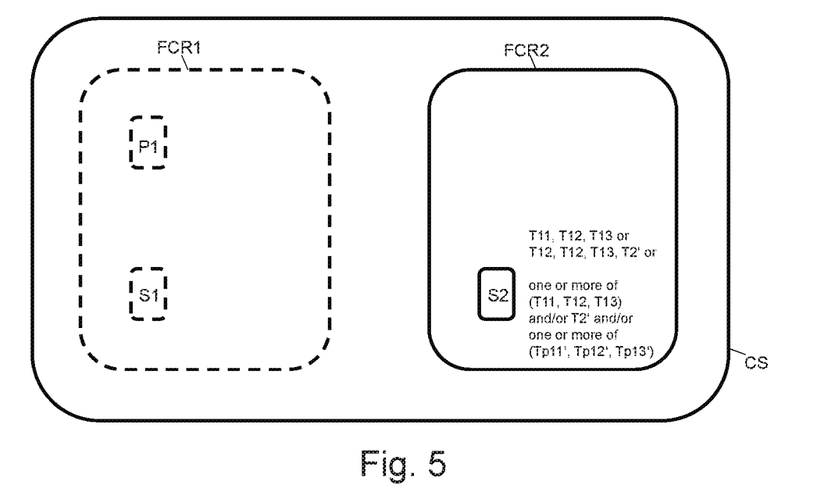

In the case that the at least one first fault-containment region FCR1 is faulty, as shown in FIG. 5, the tasks of said specific set of tasks are elected such, that the second safety-processor S2, by executing said specific set of tasks, delivers a functionality corresponding or identical to the first safety functionality, or the second safety-processor S2, by executing said specific set of tasks, delivers a functionality corresponding or identical to the first safety functionality and part of the first performance functionality.

For example, in the faulty the specific set of tasks comprises all tasks T11, T12, T13 of the first safety processor S1, which this processor is executing in the non-faulty case, so that the second safety processor S2 can deliver the first safety functionality.

In another example, the specific set of tasks comprises the tasks Ts21, Ts22, Ts23 already being executed by the second safety processor S2 (which may be identical to the tasks of the first safety processor) and one or more additional "new" tasks Ts2', so that the second safety processor S2 is capable of delivering the first safety functionality or the first safety functionality and additionally part of the first performance functionality.

It may also be possible, that the second safety processor S2, in addition to the tasks described above, in the faulty case of the first fault-containment region FCR1 executes reduced (performance) tasks T11', T12' of the first performance processor P1.

Figure 6:
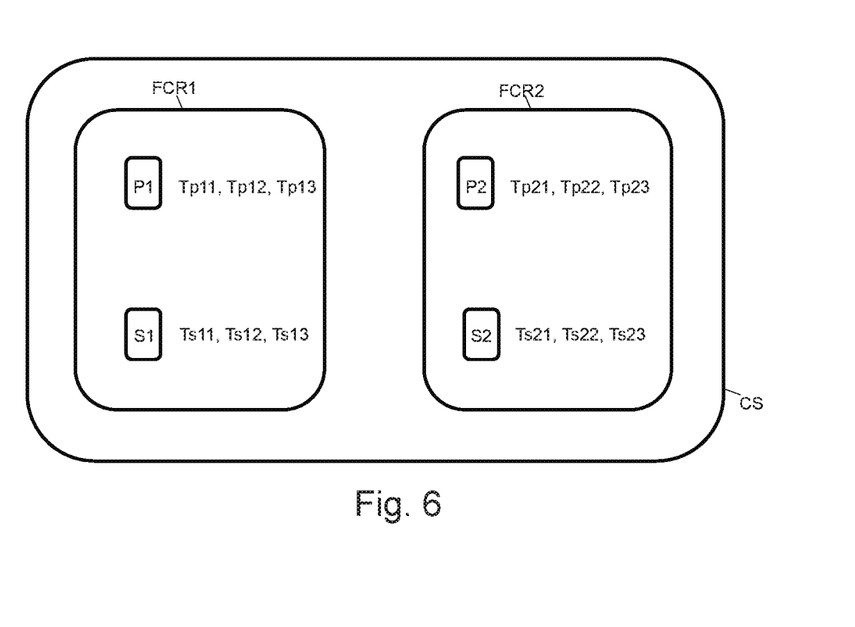
Figure 7:
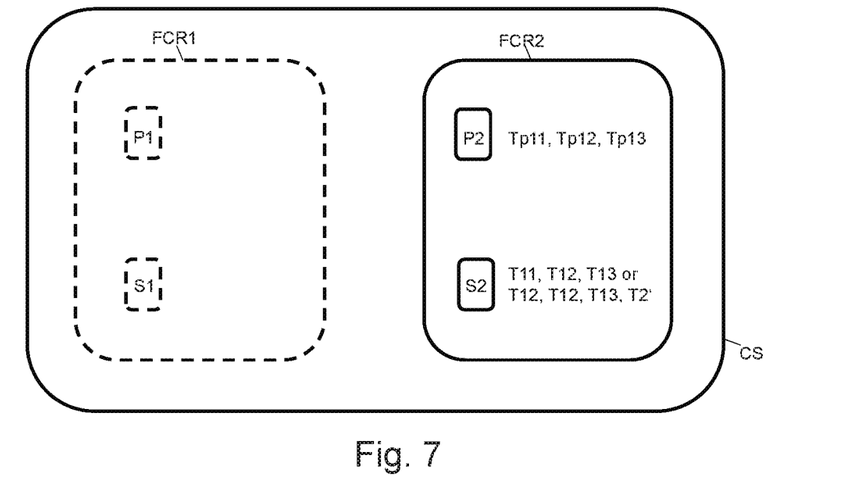

FIG. 6 depicts the case that the at least second fault-containment region FCR2 comprises in addition to the second safety processor S2 a second performance processor P2. In this case the tasks of said specific may be elected such that by executing said specific set of tasks the processors S2, P2 of the second fault-containment region FCR2 can deliver the first safety functionality and part of the or the complete first performance functionality.

In this case, for example, the second safety processor S2 delivers the first safety functionality as described above and the second performance processor P2 delivers the first performance functionality or part of the first performance functionality, for example by executing the "performance" tasks Tp11, Tp12, Tp13 of the first performance processor P1.

Now, referring back to the computer system CS, it is in anther embodiment of the invention assumed that in the case that the computer system CS does not exhibit a failure the processors P1, S1 of the first fault-containment region together with at least one processor (S2, P2) of the second fault-containment region FCR2 execute specific tasks Tp11, Tp12, Tp13 (first performance functionality), Ts11, Ts12, Ts13 (first safety functionality) and Ts21, Ts22, Ts23 (second safety functionality), which tasks together are completely describing the control process (COP) for autonomous maneuvering.

Optionally the second fault-containment region FCR2 may comprise a second performance processor P2, which when executing its tasks Tp21, Tp22, Tp23 delivers a second performance functionality. In this case, said second performance functionality can be necessary for describing the complete COF, but there are alternative embodiments, where the second performance functionality is not necessary to deliver a complete COF.

Now, the tasks Tp11, Tp12, Tp13; Ts11, Ts12, Ts13; Ts21, Ts22, Ts23 of said specific set of tasks can be elected such, that in the case that the second fault-containment region FCR2 is faulty, the first non-faulty fault-containment region FCR1, by executing said specific set of tasks, delivers, in addition to the first safety functionality and to the first performance functionality, a functionality corresponding or identical to the second safety functionality.

Figure 8:
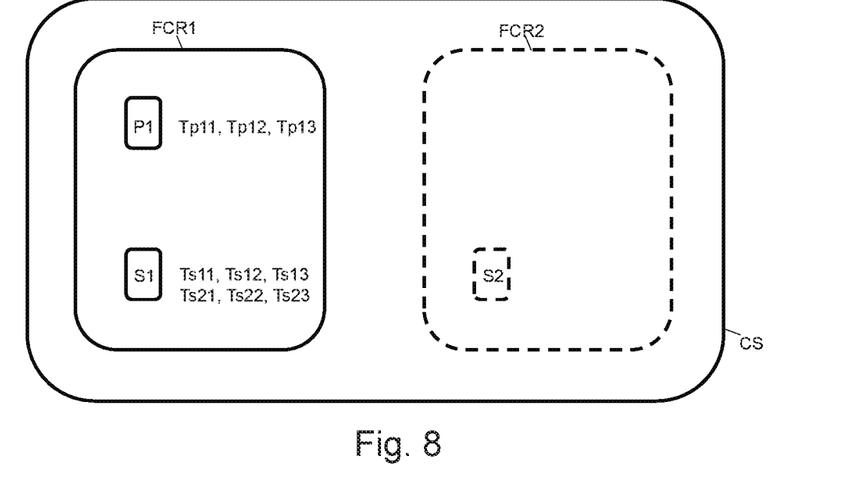

In particular, it can be provided that the tasks of said specific task set are elected such that the first safety processor S1 delivers, in addition to the first safety functionality, the second safety functionality, as shown in FIG. 8.

In the case that the second fault-containment region FCR2 comprises in addition to the second safety processor S2 a second performance processor P2 (FIG. 6), the at least one first non-faulty fault-containment region FCR1, may also, by executing said specific set of tasks, delivers, in addition to the first safety functionality and in addition to the first performance functionality, a functionality corresponding or identical to the second safety functionality, and preferably an additional functionality, which is corresponding or identical to the second performance functionality, or which additional functionality delivers at least a part of the second performance functionality.

Figure 9:
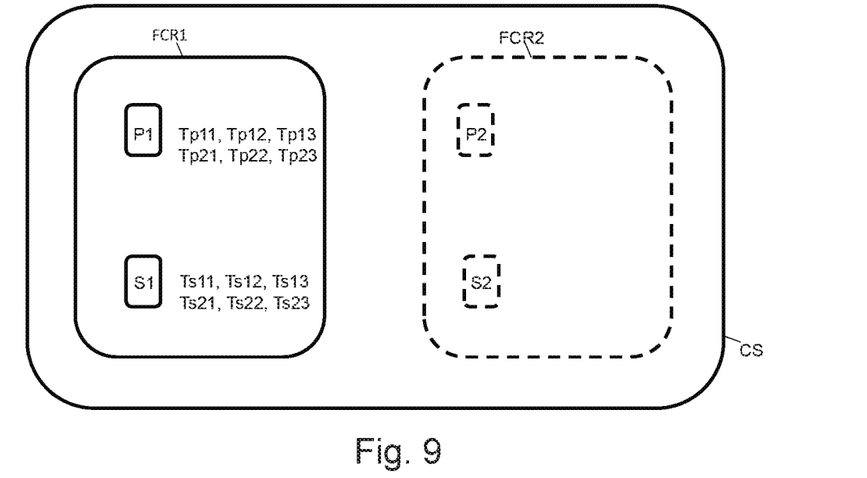

In this case, in particular, the tasks of said specific task set are elected such that the first performance processor P1 delivers said additional functionality, for example by additionally executing the tasks Tp21, Tp22, Tp23 of the second performance processor P2 (FIG. 9).

Assuming again the case where both fault-containment region FCR1, FCR2 together realize the COF, the tasks of said specific set of tasks are elected such, that in the case that the first fault-containment region FCR1 is faulty, the second non-faulty fault-containment region FCR2, by executing said specific set of tasks, delivers, in addition to the functionality or functionalities of its processor S2, P2, a functionality corresponding or identical to the first safety functionality.

Figure 10:
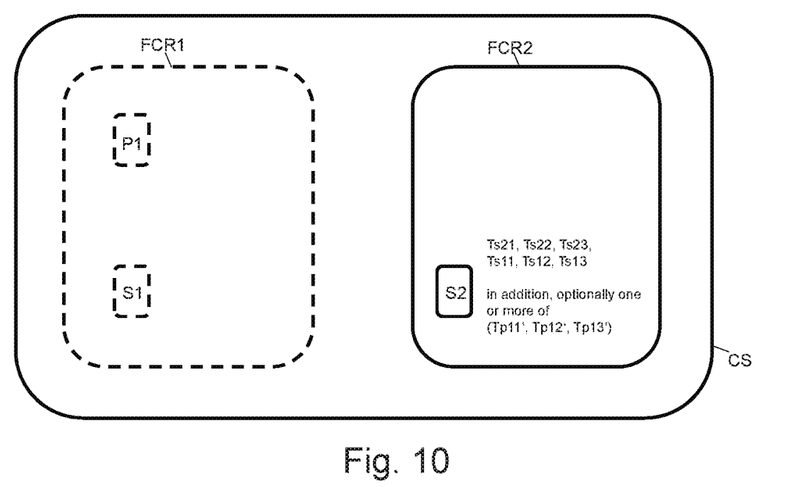

For example, as shown in FIG. 10, the second safety processor S2 delivers, in addition to its second functionality, the functionality corresponding or identical to the first safety functionality, for example by executing in addition to its tasks T21, T22, T23 the tasks T11, T12, T13, of the first safety processor S1.

It may also be provided that the second safety processor S2 delivers, in addition, part of the functionality of the first performance processor P1, for example by executing one or more reduced tasks Tp11', . . . of the first performance processor P1.

Figure 11:
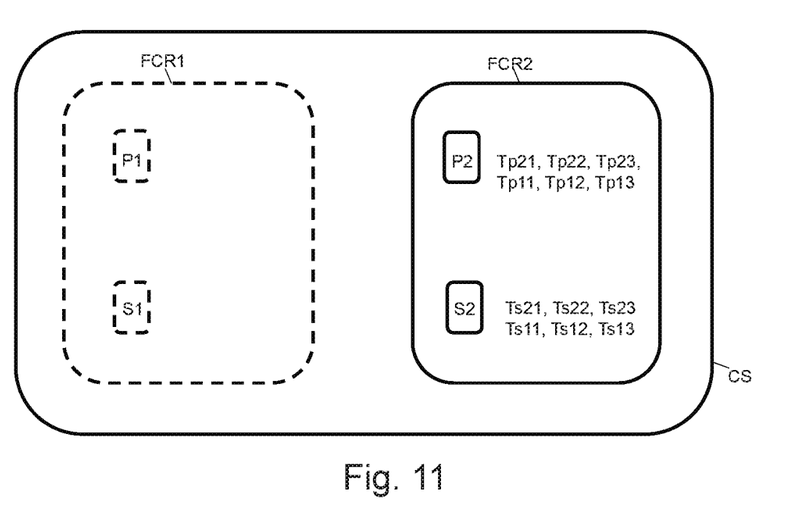

For example, in the case that the that the second fault-containment region FCR2 comprises in addition to second safety processor S2 at second performance processor P2, said second performance processor P2 can deliver, in addition to its functionality, at least part of the first performance functionality or the full first performance functionality, in particular by additionally executing the tasks Tp11, Tp12, Tp13 of the first performance processor P1 (FIG. 11).

Figure 12:
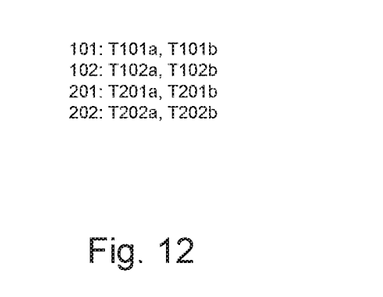

FIG. 12 depicts an example of a set of tasks T101a, T101b, T102a, T102b, T201a, T201b, T202a, T202b the fault-tolerant computer system CS according to FIG. 1 executes in order to maneuver the vehicle partly-autonomously or fully-autonomously in the case when the CS does not exhibit a failure. Furthermore, FIG. 12 depicts the task assignment to the processors 101, 102, 201, 202.

Figure 13:
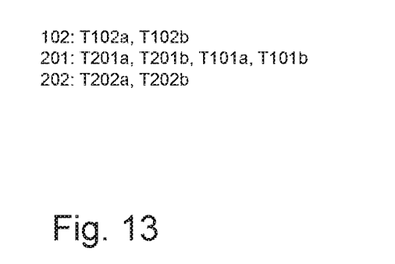

FIG. 13 depicts an example of a set of tasks T101a, T101b, T102a, T102b, T201a, T201b, T202a, T202b the fault-tolerant computer system CS according to FIG. 2 executes in order to maneuver the vehicle partly-autonomously or fully-autonomously in the case when the CS does not exhibit a failure. Furthermore, FIG. 13 depicts the task assignment to the processors 201, 102, 202.

Figure 14:
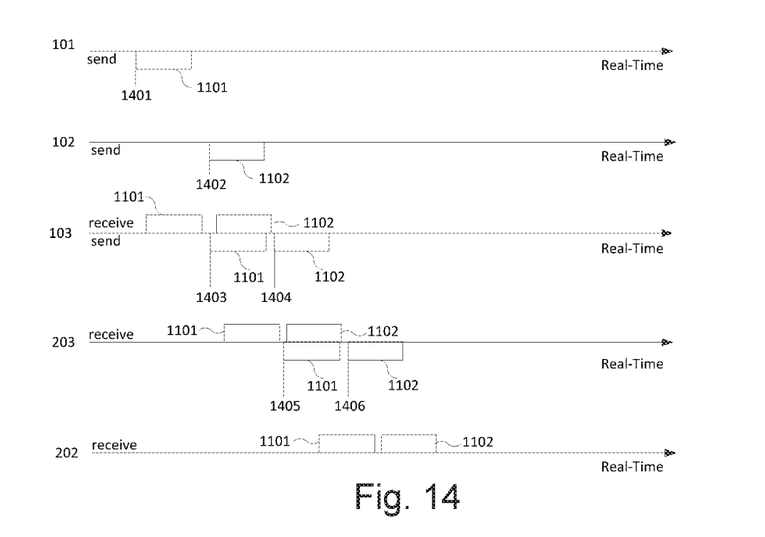

FIG. 14 depicts an example of communication in the CS. In this example the communication is realized in form of time-triggered communication. Time-triggered communication means that at least two of the components of the CS, i.e., at least two components of the set of performance processors 101, 201, safety processors 102, 202, and communication subsystem 103, 203 are synchronized to each other. Synchronization means that two components have at the same point in real-time about the same perception of current time. In a typical case the components would be synchronized to each other with a difference of their perception of time in the order of single digit microseconds or even below. Time-triggered communication means further that those components that are synchronized to each other initiate the transmission and/or forwarding and/or reception of at least a subset of messages that they send with respect to a given communication plan that is processed with respect to the synchronized time of the components.

In the communication scenario in FIG. 14 time-triggered communication between the performance processor 101, the safety processors 102, 202 using the communication subsystem 103, 203 is depicted. Here, 101 sends a message 1101 at a point in time 1401, 102 sends a message 1102 at a point in time 1402 to the communication subsystem 103. The communication subsystem forwards the frames at points in time 1403 and 1404 to the communication subsystem 203 in the respective other fault-containment region 20. Finally, communication subsystem 203 forwards the messages 1101 and 1102 to the safety processor 202 at points in time 1405 and 1406. In this scenario, the points in time 1401-1406 are part of the communication schedule.

Figure 15:
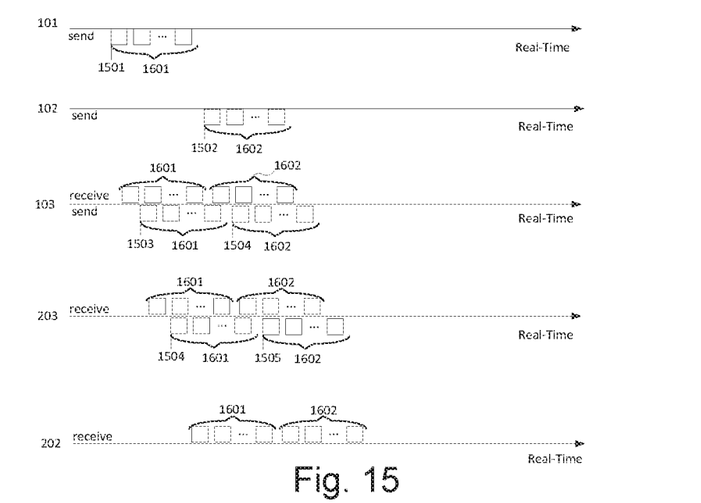

FIG. 15 depicts a similar communication scenario of time-triggered communication from the performance processor 101 and safety processor 102 to the safety processor 202. In contrast to FIG. 14, here the points in time that trigger communication is associated with more than one messages. For example, at point in time 1501 the performance processor 101 initiates the transmission of a multitude of messages 1601 rather than a single message as is the case in FIG. 15. The remainder of FIG. 15 is analogous to FIG. 14 with the exception that always multitudes of messages are sent/forwarded/received.

Figure 16:
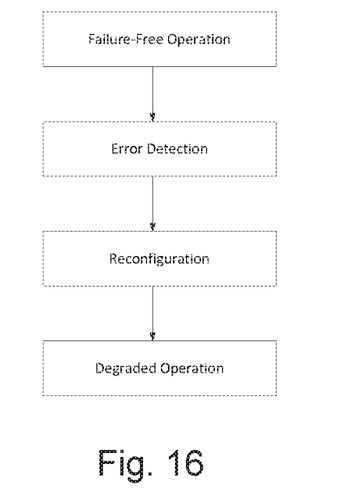

FIG. 16 depicts a sequence of operational steps that ensures that the partly-autonomous and/or fully-autonomous vehicle operation remains save. These steps include starting from a Fault-Free Operation, Error Detection, Reconfiguration, and finally Degraded Operation.

Error detection can be achieved by any or an arbitrary combination of state-of-the-art error detection functions. For example the processors 101, 102, 201, 202 can execute built-in self-tests. Error detection can also be implemented by the processors 101, 102, 201, 202 and/or elements of the communication subsystem 103, 203 checking each other. I.e., the CS can be configured in a way such that some or all of the processors 101, 102, 201, 202 periodically generate life-sign messages that are communicated to some or all of the respective other processors 101, 102, 201, 202 via the communication subsystem 103, 203. Thus, the error of a processor 101, 102, 201, 202 can be detected by a respective other processor 101, 102, 201, 202, when the respective other processor 101, 102, 201, 202 does not receive the life-sign message in time.

When a processor 101, 102, 201, 202 detects the error of a respective other processor, then a reconfiguration of the task to processor and/or a change in the communication schedule can be executed.

The invention claimed is:

1. A fault-tolerant high-performance computer system (CS) for executing control processes for autonomous maneuvering of a vehicle, wherein a control process (COP) comprises tasks, the computer system (CS) comprising:
    processors (S1, P1; S2, P2) for executing the tasks of the control process (COP); and
    a number n of fault-containment regions (FCR1, FCR2), with n≥2, wherein each fault-containment region (FCR1, FCR2) comprises at least one processor constructed as safety-processor (S1, S2), and wherein at least one fault-containment region (FCR1, FCR2) additionally comprises at least one processor constructed as performance processor (P1, P2), and wherein in the case of a failure of one fault-containment region (FCR1, FCR2), or, for n≥3, of the failure of one or more, at maximum n−1, fault-containment regions, the computer system (CS) is configured to execute at least a specific set of tasks on the remaining, non-faulty fault-containment region or non-faulty fault-containment regions, wherein the tasks of said specific set of tasks are elected in such a way that
        the computer system (CS) remains capable of autonomous maneuvering or at least partially maneuvering the vehicle, or
        the computer system (CS) is at least capable of bringing the vehicle into a safe state.

2. The computer system of claim 1, which comprises exactly two fault-containment regions (FCR1, FCR2).

3. The computer system of claim 1, wherein exactly one of the fault-containment regions (FCR1) comprises a performance processor.

4. The computer system of claim 1, wherein when the computer system (CS) does not exhibit a failure the processors (P1, S1) of at least one, so-called first, fault-containment region, preferably of exactly one, so-called first, fault-containment region (FCR1), which at least one first fault-containment region comprises at least one performance processor (P1) additionally to at least one safety processor (S1), execute specific tasks (Tp11, Tp12, Tp13; Ts11, Ts12, Ts13), which tasks are completely describing the control process (COP) for autonomous maneuvering, and wherein said at least one performance processor (P1), when executing its tasks (Tp11, Tp12, Tp13), provides a specific functionality, the so-called first performance functionality, and said at least one safety processor (S1), when executing its tasks (Ts11, Ts12, Ts13), provides another functionality, the so-called first safety functionality.

5. The computer system of claim 4, wherein the tasks of said specific set of tasks are elected such, that in the case that the at least one first fault-containment region (FCR1) is faulty,
- at least one, so-called second, safety-processor (S2) of at least one non-faulty, so-called second, fault-containment region (FCR2), by executing said specific set of tasks, delivers a functionality corresponding or identical to the first safety functionality, or
- at least one, so-called second, safety-processor (S2) of at least one non-faulty, so-called second, fault-containment region (FCR2), by executing said specific set of tasks, delivers a functionality corresponding or identical to the first safety functionality and part of the first performance functionality, or
- in the case that the at least one non-faulty, so-called second, fault-containment region (FCR2) comprises in addition to the at least one, so-called second, safety processor (S2) at least one, so-called second, performance processor (P2), the tasks of said specific set of tasks are elected such that by executing said specific set of tasks the processors (S2, P2) of the second fault-containment region (FCR2) can deliver the first safety functionality and part of the or the complete first performance functionality, wherein preferably the at least one second safety processor (S2) delivers the first safety functionality and the at least one second performance processor (P2) delivers the first performance functionality or part of the first performance functionality.

6. The computer system of claim 1, wherein when the computer system (CS) does not exhibit a failure the processors (P1, S1) of at least one, so-called first, fault-containment region, preferably of exactly one, so-called first, fault-containment region (FCR1), which at least one first fault-containment region comprises at least one performance processor (P1) additionally to at least one safety processor (S1), together with at least one processor (S2, P2) of at least one, so-called second, fault-containment region (FCR2) execute specific tasks (Tp11, Tp12, Tp13; Ts11, Ts12, Ts13, Ts21, Ts22, Ts23), which tasks are completely describing the control process (COP) for autonomous maneuvering, and wherein said at least one performance processor (P1), when executing its tasks (Tp11, Tp12, Tp13), provides a specific functionality, the so-called first performance functionality, and said at least one safety processor (S1), when executing its tasks (Ts11, Ts12, Ts13), provides another functionality, the so-called first safety functionality, and wherein the at least one safety processor (S2) of said at least one second fault-containment region (FCR2), when executing its tasks, provides a third functionality, the so-called second safety functionality, and wherein optionally said at least one second fault-containment region (FCR2) comprises at least one, so-called second, performance processor (P2), which at least one second performance processor (P2) delivers, when executing its tasks, a second performance functionality.

7. The computer system of claim 6, wherein the tasks of said specific set of tasks are elected such, that in the case that the at least one second fault-containment region (FCR2) is faulty, the at least one first non-faulty fault-containment region (FCR1), by executing said specific set of tasks, delivers, in addition to the first safety functionality and to the first performance functionality, a functionality corresponding or identical to the second safety functionality.

8. The computer system of claim 7, wherein the tasks of said specific task set are elected such that the at least one safety processor (S1) delivers, in addition to the first safety functionality, the second safety functionality.

9. The computer system of claim 7, wherein the at least one second fault-containment region (FCR2) comprises in addition to the at least one second safety processor (S2) at least one second performance processor (P2), which at least one second performance processor (P2) delivers, when executing its tasks, a second performance functionality, in the case that said at least one second fault-containment region (FCR2) is faulty, the at least one first non-faulty fault-containment region (FCR1), by executing said specific set of tasks, delivers, in addition to the first safety functionality and in addition to the first performance functionality, a functionality corresponding or identical to the second safety functionality, and preferably an additional functionality, which is corresponding or identical to the second performance functionality, or which additional functionality delivers at least a part of the second performance functionality, wherein preferably the tasks of said specific task set are elected such that the at least one performance processor (P1) of the at least one non-faulty first fault-containment region (FCR1) delivers said additional functionality.

10. The computer system of claim 6, wherein the tasks of said specific set of tasks are elected such, that in the case that the at least one first fault-containment region (FCR1) is faulty, the at least one second non-faulty fault-containment region (FCR2), by executing said specific set of tasks, in addition to the functionality or functionalities of its at least one processor (S2, P2), is configured to deliver a functionality corresponding or identical to the first safety functionality, wherein preferably the at least one second safety processor (S2), in addition to its second functionality, is configured to deliver the functionality corresponding or identical to the first safety functionality, wherein preferably the at least one second safety processor (S2) is configured to deliver part of the functionality of the first performance processor (P1) of the at least one first fault-containment region (FCR1).

11. The computer system of claim 10, wherein the at least one second fault-containment region (FCR2) comprises in addition to the at least one second safety processor (S2) at least one second performance processor (P2) wherein the second performance processor (P2), in addition to its functionality, is configured to deliver at least part of the functionality of the first performance processor (P1) or the full functionality of the first performance processor (P1).

12. The computer system of claim 1, wherein at least one of the fault-containment regions (FCR1, FCR2) is configured to exchange information with sensors and actuators in the vehicle via communication channels (104, 204).

13. The computer system of claim 1, which comprises a communication subsystem (103, 203) for the exchange of information between the fault-containment regions (FCR1, FCR2).

14. The computer system of claim 1, wherein the safety processors (S1, S2) of different fault-containment regions (FCR1, FCR2) are identical.

15. The computer system of claim 1, wherein the performance processors (P1, P2) of different fault-containment regions (FCR1, FCR2) are identical.

16. The computer system of claim 1, wherein the safety processors (S1, S2) of at least two different fault-containment regions (FCR1, FCR2) are different.

17. The computer system that of claim 1, wherein the performance processors (P1, P2) of at least two different fault-containment regions (FCR1, FCR2) are different.

* * * * *